(12) United States Patent
Boucher et al.

(10) Patent No.: US 6,354,909 B1
(45) Date of Patent: *Mar. 12, 2002

(54) SUBSTRATE DICING METHOD

(76) Inventors: John N. Boucher, 16539 E. Shirley Shores Rd., Tavares, FL (US) 32778; David E. Bajune, 6800 W. State Rd. 46, Sanford, FL (US) 32773

( * ) Notice: Subject to any disclaimer, the term of this patent is extended or adjusted under 35 U.S.C. 154(b) by 0 days.

This patent is subject to a terminal disclaimer.

(21) Appl. No.: 09/645,917

(22) Filed: Aug. 25, 2000

Related U.S. Application Data

(60) Continuation of application No. 09/358,046, filed on Jul. 21, 1999, now Pat. No. 6,152,803, which is a continuation-in-part of application No. 09/022,619, filed on Feb. 12, 1998, now Pat. No. 5,934,973, which is a division of application No. 08/546,216, filed on Oct. 20, 1995.
(60) Provisional application No. 60/126,174, filed on Mar. 25, 1999.

(51) Int. Cl.[7] .................................................. B24B 1/00
(52) U.S. Cl. ................................ 451/12; 451/5; 451/9; 451/41; 451/177; 125/13.01; 125/12
(58) Field of Search ............................ 451/5, 9, 12, 41, 451/177; 125/13.01, 12

(56) References Cited

U.S. PATENT DOCUMENTS

| | | |
|---|---|---|
| 2,578,869 A | 12/1951 | Washburn |
| 2,583,791 A | 1/1952 | Neff |
| 3,090,171 A | 5/1963 | Stimson |
| 3,626,921 A | 12/1971 | Lane |
| 3,645,002 A | 2/1972 | Hefti |
| 3,670,153 A | 6/1972 | Rempert et al. |
| 3,763,698 A | 10/1973 | Suzuki et al. |
| 3,803,906 A | 4/1974 | Ross |
| 3,965,621 A | 6/1976 | Grieb et al. |
| 3,987,670 A | 10/1976 | Tuzzeo et al. |
| 4,007,411 A | 2/1977 | Saito |
| 4,056,022 A | 11/1977 | Ray |
| 4,104,833 A | * 8/1978 | Glowacki ............... 451/21 |
| 4,180,048 A | 12/1979 | Regan |
| 4,219,004 A | 8/1980 | Runyon |
| 4,233,625 A | 11/1980 | Altman |
| 4,435,837 A | 3/1984 | Abernathy |
| 4,557,599 A | 12/1985 | Zimring |
| 4,569,326 A | * 2/1986 | Tanizaki et al. ............ 125/13 |

(List continued on next page.)

*Primary Examiner*—Joseph J. Hail, III
*Assistant Examiner*—Shantese McDonald
(74) *Attorney, Agent, or Firm*—Allen, Dyer, Doppelt, Milbrath & Gilchrist, P.A.

(57) ABSTRACT

A programmable dicing saw is operable with movement of its spindle and work surface for aligning a dicing blade juxtaposed between flanges on the spindle and dicing a substrate along a predetermined blade path. By locating the center of the substrate, an efficient movement of the blade relative to the substrate center rather than the work surface center saves time. Locating the center of the blade includes aligning opposing substrate edges and edge location data entry into a processor for calculation of the substrate center and control based on the substrate center. In addition, prior to cutting along the edges of the substrate, the dicing blade is first aligned for travel parallel to and proximate the edge of the substrate, and an alignment offset is provided to the programmable dicing saw for laterally moving the blade toward the center of the substrate prior to making a cut and avoiding damage to the blade and substrate that typically results when the blade slides along the substrate edge rather than cutting into the substrate. In addition, by knowing the substrate center location, an arcuate cut can be accurately made into the substrate by making multiple straight cuts with a rotation of the substrate about its center between each cut. A flange clearance is monitored by measuring the blade exposure after a preselected number of cuts during the substrate dicing, and a minimum flange clearance permitted before blade movement toward the substrate is automatically stopped.

22 Claims, 7 Drawing Sheets

U.S. PATENT DOCUMENTS

| | | |
|---|---|---|
| 4,593,406 A | 6/1986 | Stone |
| 4,656,896 A | 4/1987 | Bietz et al. |
| 4,707,647 A | 11/1987 | Coldren et al. |
| 4,725,884 A | 2/1988 | Gurnell et al. |
| 4,759,073 A | 7/1988 | Shah et al. |
| 4,787,362 A | 11/1988 | Boucher et al. |
| 4,819,167 A | 4/1989 | Cheng et al. |
| 4,971,021 A * | 11/1990 | Kubotera et al. ........ 125/13.01 |
| 5,016,199 A | 5/1991 | McMurtry et al. |
| 5,031,360 A | 7/1991 | Farnworth et al. |
| 5,390,446 A | 2/1995 | Kazui et al. |
| 5,422,579 A | 6/1995 | Yamaguchi |
| 5,433,649 A * | 7/1995 | Nishida ..................... 451/5 |
| 5,459,794 A | 10/1995 | Ninomiya et al. |
| 5,573,442 A | 11/1996 | Morita et al. |
| 5,718,615 A | 2/1998 | Boucher et al. |

* cited by examiner

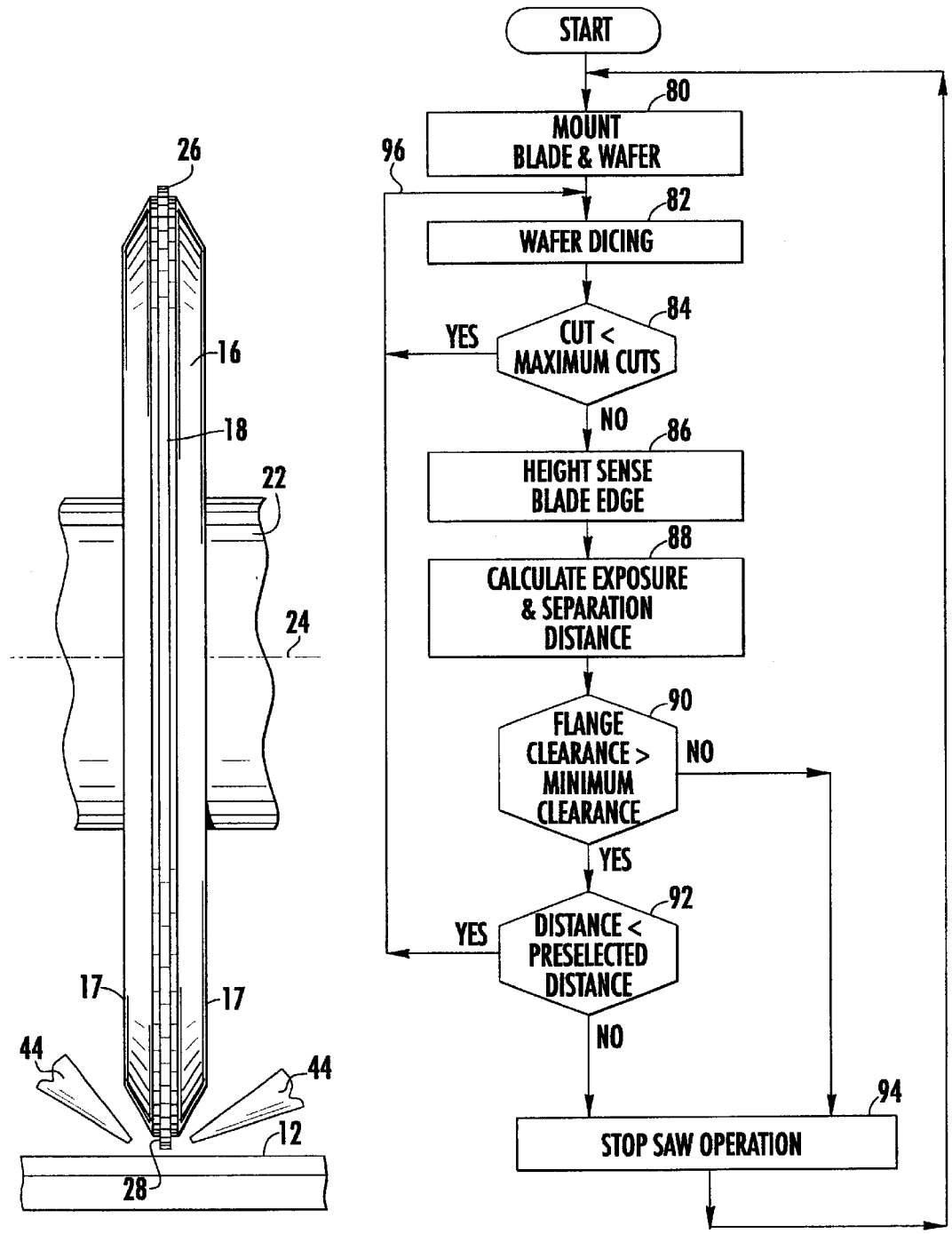

SUBSTRATE DICING METHOD

CROSS REFERENCE TO RELATED APPLICATION

This application is a continuation of application Ser. No. 09/358,046 filed on Jul. 21, 1999, now U.S. Pat. No. 6,152,803, which itself is a continuation-in-part application of application Ser. No. 09/022,619 filed Feb. 12, 1998, now U.S. Pat. No. 5,934,973 for a "Semiconductor Wafer Dicing Saw," which itself is a divisional application of application Ser. No. 08/546,216 filed Oct. 20, 1995 for a "Semiconductor Wafer Dicing Method," and incorporates by reference and claims priority to provisional Application No. 60/126,174 filed Mar. 25, 1999 for an "Alignment System And Method For A Programmable Dicing Saw," all of which are commonly owned with the present application.

BACKGROUND OF INVENTION

1. Field of Invention

The invention relates generally to the dicing of semiconductor wafers and, more particularly to the monitoring of blade location and flange clearance for safely cutting a semiconductor wafer.

2. Background Art

Die separation, or dicing, by sawing is the process of cutting a microelectronic substrate into its individual circuit die with a rotating circular abrasive saw blade. This process has proven to be the most efficient and economical method in use today. It provides versatility in selection of depth and width (kerf) of cut, as well as selection of surface finish, and can be used to saw either partially or completely through a wafer or substrate.

Wafer dicing technology has progressed rapidly, and dicing is now a mandatory procedure in most front-end semiconductor packaging operations. It is used extensively for separation of die on silicon integrated circuit wafers. Increasing use of microelectronic technology in microwave and hybrid circuits, memories, computers, defense and medical electronics has created an array of new and difficult problems for the industry. More expensive and exotic materials, such as sapphire, garnet, alumina, ceramic, glass, quartz, ferrite, and other hard, brittle substrates, are being used. They are often combined to produce multiple layers of dissimilar materials, thus adding further to the dicing problems. The high cost of these substrates, together with the value of the circuits fabricated on them, makes it difficult to accept anything less than high yield at the die-separation phase.

Dicing semiconductor wafers by sawing is an abrasive machining process similar to grinding and cutoff operations that have been in use for decades. However, the size of the dicing blades used for die separation makes the process unique. Typically, the blade thickness ranges from 0.6 mils to 500 mils, and diamond particles (the hardest well known material) are used as the abrasive material ingredient. Because of the diamond dicing blade's extreme fineness, compliance with a strict set of parameters is imperative, and even the slightest deviation from the norm could result in complete failure.

The diamond blade is a cutting tool in which each exposed diamond particle comprises a small cutting edge. Various dicing blades are available commercially. By way of example, a sintered diamond blade includes diamond particles which are fused into a soft metal such as brass or copper, or incorporated by means of a powdered metallurgical process; a plated diamond blade includes diamond particles which are held in a nickel bond produced by an electroplating process; and a resinoid diamond blade is one in which diamond particles are typically held in a resin bond to create a homogeneous matrix. Silicon wafer dicing typically uses the plated diamond blade, which has proven to be most successful for this application.

Because most state-of-the-art dicing equipment has been designed specifically to dice silicon wafers, problems arise when it is necessary to cut harder and/or more brittle materials. Blade speed and torque, depth of cut, feed rate, and other performance parameters have been optimized for silicon. However, hard and brittle materials require different blades and equipment operating parameters, the proper selection of which is a key to success for high-yield dicing. In any cutting operation, tool sharpness is of primary importance. More exactly, it is necessary that the cutting tool maintain its sharpness throughout the cutting operation. When cutting hard material such as sapphire or garnet, the cutting edges become dull quite rapidly. Because the dulled cutting edges cannot be re-sharpened in the usual manner, it is desirable that they be pulled loose from the blade, or else be fractured to expose new sharp cutting edges.

An important characteristic of the resinoid diamond blade that promotes effective cutting is its self-sharpening ability. The blade requires no dressing at all, in contrast to most metal-bonded (sintered or electroplated) diamond blades. Sharpening is accomplished automatically by the cutting process. As a cutting edge becomes dull, it experiences increased cutting forces that eventually either pull the diamond particle loose from the blade or else fracture it to produce a new sharp cutting edge. A diamond blade that does not exhibit this property cannot properly cut hard materials, nor can it perform properly if saw operating parameters interfere with the self-sharpening mechanism.

By way of example, U.S. Pat. No. 4,219,004 addresses a problem in the art of getting the blade cutting surface perpendicular to the substrate being cut and discloses blade mounting means comprising a pair of generally flat round collars, flanges, having a round central opening for receipt by the saw spindle. Further, the outer diameters of the collars are less than the blade diameter for providing an exposure of approximately 15 mils. A blade exposure not greater than 20 to 25 times the blade thickness is recommended. Replacing the collars with those having smaller diameter are disclosed for providing desired exposure and for replacing collars as the blade wears and exposure is reduced. Methods for monitoring or measuring the exposure during the dicing of the substrate is not addressed. U.S. Pat. No. 4,787,362 discloses an abrasive cutting blade having very high rigidity useful in dicing silicon wafers and hard materials. The use of the flange or spacer for maintaining blade rigidity and providing blade exposure sufficient for completely penetrating the work piece and cutting partially into the intermediate carrier typically used is disclosed. Wobble or run-out is of concern and is inversely proportional to the blade exposure. As a result, blade exposure is held to tight and typically minimal dimensions. A rigid blade core is described for preventing run-out from causing the core to make contact with the workpiece and causing widening of the cut and a less than even cut. Making the flange larger for providing less exposure is not addressed. However, less exposure means greater chance for inadequate cooling and greater chance of the flange hitting the work piece. There remains a need to effectively and economically resolve these problems. U.S. Pat. No. 3,987,670 discloses a displacement transducer manually applied to a diamond blade cutting surface for measuring a distance from the blade cutting edge to a fixed reference distance on the blade. The transducer is mounted on a portable fixture. Blade wear of diamond blades generally in the range of 18 to 36 inches are addressed and the problems associated with measuring blade wear of these blades are identified. The transducer is provided with suitable readout devices to determine blade wear. Although blade wear is addressed, it is for relatively large, easily visible blade sizes, and measured while the blade is held motionless. Further, the issues associated with exposure and depth of cut into a substrate is not addressed. Flange clearance is not a major concern for 18" to 36" blades.

There is a need to monitor blade exposure, the amount of blade extending from the flanges holding the blade therebetween, during a wafer or substrate dicing for maintaining sufficient clearance between the flange edges and the substrate to provide adequate cooling, and further for preventing the flanges from contacting the substrate, often containing electronic chips valued in the many thousands of dollars. There is further a need to monitor and control the location of the cutting blade with respect to the location of the wafer to be cut and to efficiently and effectively control positions prior to a first cut and during movement of the wafer on its table for subsequent cuts. By way of example, a dicing machine user will typically try to mount the wafer at the center of the table or chuck holding the wafer during the cutting operation. In the alternative, computer aided chuck and saw movement will determine measured cuts from the table center and move the dicing saw relative to the center coordinates, sometimes actually moving the table to the center prior to moving it to the appropriate cutting location. This adds expensive operating time, especially when one considers that thousands of cuts may be required within one wafer dicing project. When a cut is to be made close to an edge of the wafer, and the blade is allowed to make a cut close to the wafer edge, the blade may ripe off a section of the wafer, which can require disposal of the entire wafer, or extensive attempts and time for salvaging what is typically a very expensive wafer including multiple electronic elements.

Various approaches have been used to identify a locations of a workpiece in computer aided machines. By way of example, U.S. Pat. No. 4,233,625 to Altman discloses the use of television monitoring for aligning successive configurations of semiconductors. U.S. Pat. No. 5,422,579 to Yamaguchi discloses the use of a camera for identifying probe positions on a card and recognizing reference probes for providing a corrective movement to a work table. U.S. Pat. No. 4,819,167 to Cheng et al. discloses a system and method for determining the location of a semiconductor wafer relative to its destination position using an array of optical sensors positioned along an axis transverse the path of movement of the wafer. Trigger points provided by the sensor array as the wafer is moved, provide locus information data to a processor for calculating the center of the wafer. U.S. Pat. No. 3,670,153 to Rempert et al. discloses the use of a light sensing element and scanning of the object for detecting dark and light regions in determining edges of the object to be measured. In spite of the many computerized optical devices and configurations, there still remains a need to economically provide a method for effectively and efficiently locating the position of the wafer on the work table for optimizing movement of the table or workpiece during sawing operations and for providing a safe location at which the saw can operate without damage to the wafer and saw, or hazard to the saw and operator.

SUMMARY OF THE INVENTION

In view of the foregoing background, it is therefore an object of the present invention to provide a method for safely and efficiently dicing a semiconductor wafer or substrate by moving the table relative to the saw based of a location of the wafer, while preventing the blade flange from contacting the substrate. It is further an object of the invention to prevent the cutting of a substrate so close to its edge that it may shatter the substrate or damage the blade. It is yet another object of the invention to monitor flange clearance during the cutting of the wafer for cutting the wafer without having the flange contact the wafer as a result of blade wear. It is yet another object of the invention to provide automation to the traditionally manual and semiautomatic monitoring of the wafer dicing process.

These and other objects, features, and advantages of the invention, are provided by a method for dicing a substrate using a programmable dicing saw. The dicing saw includes a processor operable for movement of a spindle carrying a dicing blade and a work surface upon which the substrate is removably secured. Movement of the dicing blade toward and away from the work surface is controlled by movements within an orthogonal coordinate system having its center at a center location of the work surface. The dicing blade is mounted onto the dicing saw spindle juxtaposed between a flange pair for rotation of the dicing blade about a spindle axis. The dicing blade has an outer diameter defining a cutting edge and is greater than each flange diameter of the flange pair for providing a blade exposure for cutting into a substrate. Preferably, the substrate to be cut is removably securing onto the work surface and within a blade path of the dicing blade.

Locating the center of the substrate provides for an efficient movement of the blade relative to the center and save time when compared to attempts to manually center the substrate and move the blade during the cutting process relative to the center of the work surface rather than the center of the substrate. A preferred method of locating the center of the blade includes the steps of aligning the dicing blade with a first edge of the substrate for determining a substrate first edge location on the work surface, aligning the dicing blade with a second edge of the substrate for determining a substrate second edge location on the work surface, wherein the first edge laterally opposes the second edge and the rotational axis of the dicing blade is perpendicular to the blade paths along the first and second edges, rotating the substrate ninety degrees about an axis perpendicular thereto, aligning the dicing blade with a third edge of the rotated substrate for determining a substrate third edge location on the work surface, wherein the blade path along the third edge is perpendicular to the blade path along the first edge, and aligning the dicing blade with a fourth edge of the substrate for determining a substrate fourth edge location on the work surface, wherein the third edge laterally opposes the fourth edge. Edge data representative of the measured substrate first, second, third, and fourth edge locations is entered into the processor operable with the dicing saw for determining the center of the substrate and calculating a distance between the center of the substrate and the center of the work surface for providing a compensating command to the programmable dicing saw. Movement of the substrate is then made relative to the center of the substrate. If desired, the dicing saw is located over the center of the substrate when initiating blade and work surface movement. The spindle and work surface are moved relative to the center of the substrate for positioning the dicing blade based on the compensating command.

In a preferred operation of the dicing saw when cutting a substrate includes aligning the dicing blade for making a cut into the substrate along a first blade path, dicing the substrate along the first blade path, and subsequent blade paths as desired. The blade outer diameter reduces with each cut into the substrate, thus reducing the blade exposure, and further reducing a clearance between the flange pair and a substrate top surface for each subsequent cut. Therefore, the flange clearance is determined and monitored by measuring the blade exposure after a preselected number of cuts during the substrate dicing.

In one preferred method when aligning the blade for dicing along an edge of the substrate, the dicing blade is first aligned for travel parallel to and proximate the first edge of the substrate. An offset command is provided to the programmable dicing saw for laterally moving the blade toward the center of the substrate prior to making a cut into the substrate. The offset command is representative of a preselected offsetting displacement of the blade from the edge to avoid damage to the blade and substrate that typically results when the blade slides along the substrate edge rather than cutting into the substrate.

The present invention provides for accurately making arcuate cuts into the substrate. With such a method, the dicing blade aligning comprises first aligning the dicing blade for travel along a first blade path at a preselected distance from the center of the substrate for the dicing thereof. A desired cut is made into the substrate. Then the dicing blade is aligned for travel along a second blade path at the preselected distance from the center of the substrate for the dicing thereof, wherein the second blade path radially opposes the first blade path. A desired cut is then made. The substrate is rotated by a preselected arc and the aligning and dicing steps are repeated for providing multiple cuts within the substrate. The substrate rotating comprises incrementally rotating of the substrate a multiplicity of times sufficient for providing an arcuate cut to the substrate. With such a method, a circular shape can result.

To guard against damage to the substrate, the dicing method further comprises the step of automatically stopping the dicing of the substrate when the flange clearance is reduced to less than a preselected minimum clearance. A separation distance between the work surface and the blade cutting edge is calculated using the processor, and blade movement into the substrate is automatically stopped when the blade cutting edge is greater than a preselected separation distance. In one embodiment, the flange clearance is calculated by sensing the blade cutting edge during blade rotation and prior to the substrate cutting step for setting a reference position for the blade edge and spindle axis, and sensing the blade cutting edge after the preselected number of cuts for determining an axis position difference for the worn blade. The difference is used to update data input to the processor regarding the reduction in blade diameter, the blade exposure, and thus the step of determining the flange clearance. The blade exposure measurement is made at preselected intervals throughout the substrate dicing steps. The flange clearance is automatically calculated at preselected intervals throughout the substrate cutting. A minimum flange clearance is preselected for continuing the dicing. The minimum flange clearance should provide effective coolant flow to the blade, adequate blade rigidity and thus a squareness of cut, and an acceptable blade chipping. Calculating blade exposure includes measuring blade wear after a preselected number of cuts for automatically monitoring the exposure during the dicing step and providing a first stop movement signal to the processor when a minimum exposure results in a minimum flange clearance for the dicing steps. Calculating a separation distance between the work surface and the blade cutting edge is made and provides a second stop movement signal to the processor when a preselected maximum separation distance is measured, thus indicating blade wear. Movement of the dicing blade toward the work surface is automatically stopped when any stop movement signal is received. The exposure calculating step comprises the sensing of the blade edge during blade rotation prior to the dicing of the substrate for setting a reference position for the blade edge and spindle axis, and sensing the blade edge after the preselected number of cuts for determining an axis position difference for the worn blade. The exposure calculating step is made by the processor using the axis position difference and the flange diameter.

BRIEF DESCRIPTION OF DRAWINGS

A preferred embodiment of the invention as well as alternate embodiments are described by way of example with reference to the accompanying drawings in which:

FIG. 2 is a partial end view of a dicing blade held onto a spindle within flanges;

FIG. 7 is a flow diagram illustrating a logic of the dicing saw system of the present invention;

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
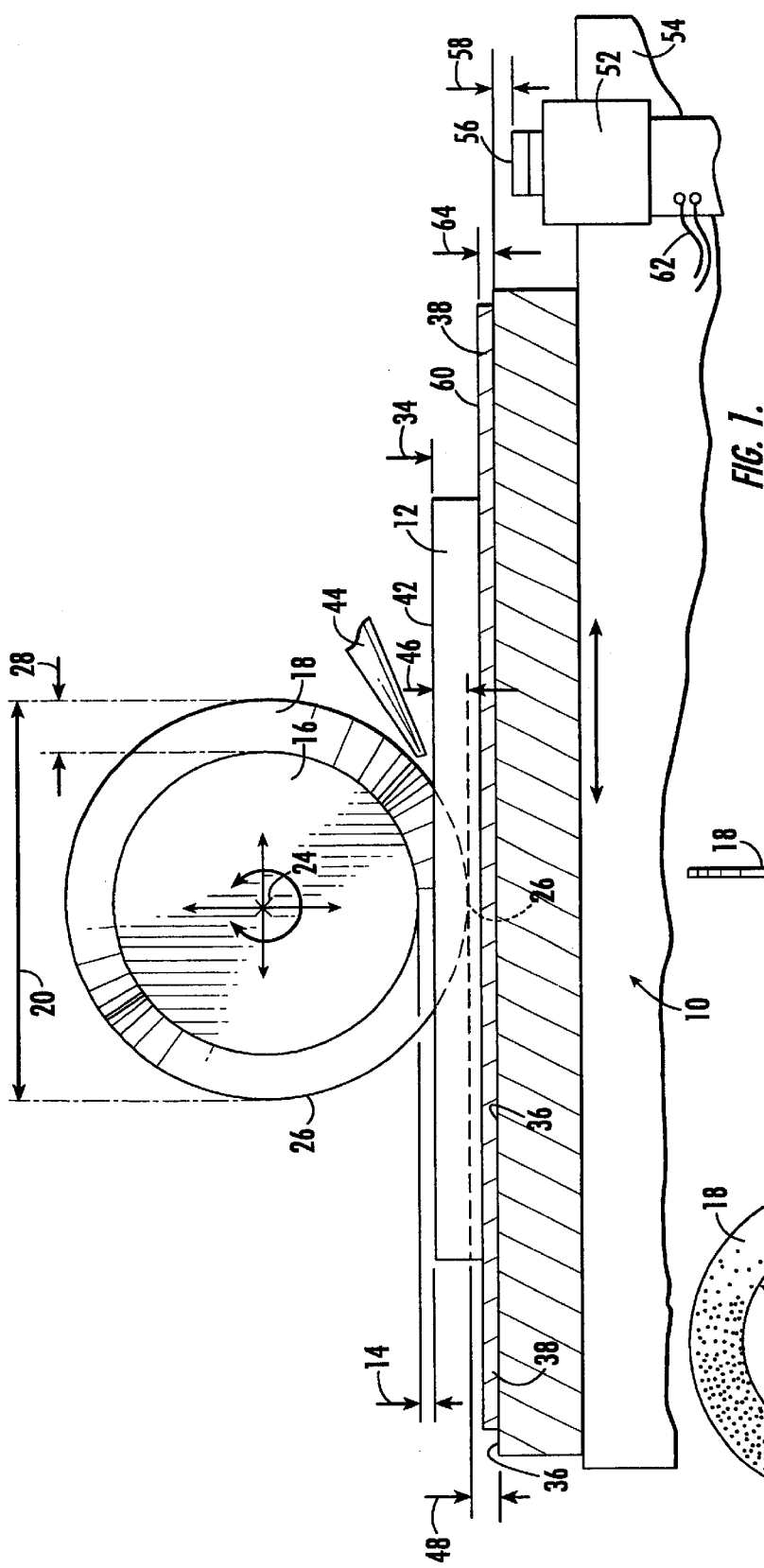
FIG. 1 is a partial diagrammatic side view of a dicing saw embodiment of the present invention.

The preferred embodiment of the present invention is described with reference to the drawings, wherein a method and system 10 for automatically dicing a semiconductor wafer or a substrate 12, herein described by way of example, provides a safe clearance 14 between a dicing blade flange 16 and the substrate 12, as illustrated with reference to FIG. 1. By way of example, a resin-bonded dicing blade 18 will wear or reduce in diameter 20 as it is used to cut various substrate materials. The blade 18 is mounted on a spindle 22, as illustrated with reference to FIG. 2, for rotation about a spindle axis 24. The flange 16 is typically a flange pair 17 holding the blade 18 between the flange pair 17. The dicing blade 18 has its diameter 20, an outer diameter, defining a cutting edge 26. The blade outer diameter 20 is greater than the diameter of each flange 16 thus providing a blade portion 28 extending radially outward from the flange pair 17 for providing this portion 28 as the blade exposure.

Figure 3B:
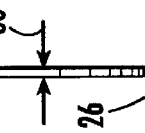
FIGS. 3a and 3b are plan and end views, respectively, of a dicing saw blade.
Figure 3A:
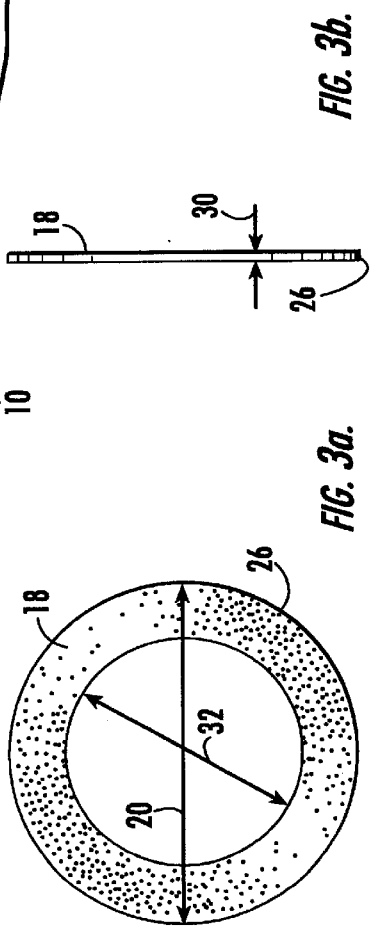

Depending on the hardness, density and abrasiveness of the blade material, as well as the cutting rates, spindle rotation speeds, and ability to cool the blade 18 while it is cutting, varying amounts of blade wear will be realized, thus reducing the blade exposure 28. The blade wear is further complicated by the type or make-up of the diamond blade 18 itself. Fine abrasive blades are more difficult to cool than blades having larger abrasives. A typical dicing blade 18 is further illustrated with reference to FIGS. 3a and 3b identifying a blade width 30 and blade inner diameter 32 as well as the outer diameter 20 defining the blade cutting edge 26.

Dicing blades 18 are typically fragile. They may be metal or resin in make-up, and are typically have widths 30 ranging from as thin as 0.00012" to 0.500". Outer diameters 20 vary from as little as 1" to 6". Due to the fragile nature of the dicing blade 18, they require stiff flanges 16 for mounting them onto the rotating spindle 22. Flanges 16 are typically made from metals such as aluminum, stainless steel or titanium. Flanges 16 for holding the dicing blade 18 come in an infinite range of diameters, each smaller to some degree than the dicing blade 18 as earlier described. The difference between the flange radius and blade radius is the blade exposure 28. It is the flange pair 17 and small blade exposure 28 extending therefrom, that gives the extremely thin dicing blade 18 a stiffness sufficient for cutting into the substrate 12.

With reference again to FIG. 1, the substrate 12 having a substrate thickness 34 is held onto a work surface 36 of the dicing saw. Typical work surfaces or dicing saw chucks, as they are also known, hold a workpiece, such as the substrate 12, using a vacuum. In many arrangements, as illustrated by way of example, with reference to FIG. 1, a carrier 38 is placed on the work surface 36 for receiving the substrate 12. Such an arrangement permits the blade 18 to cut completely through the substrate 12 without cutting into the work surface 36.

Figure 4:
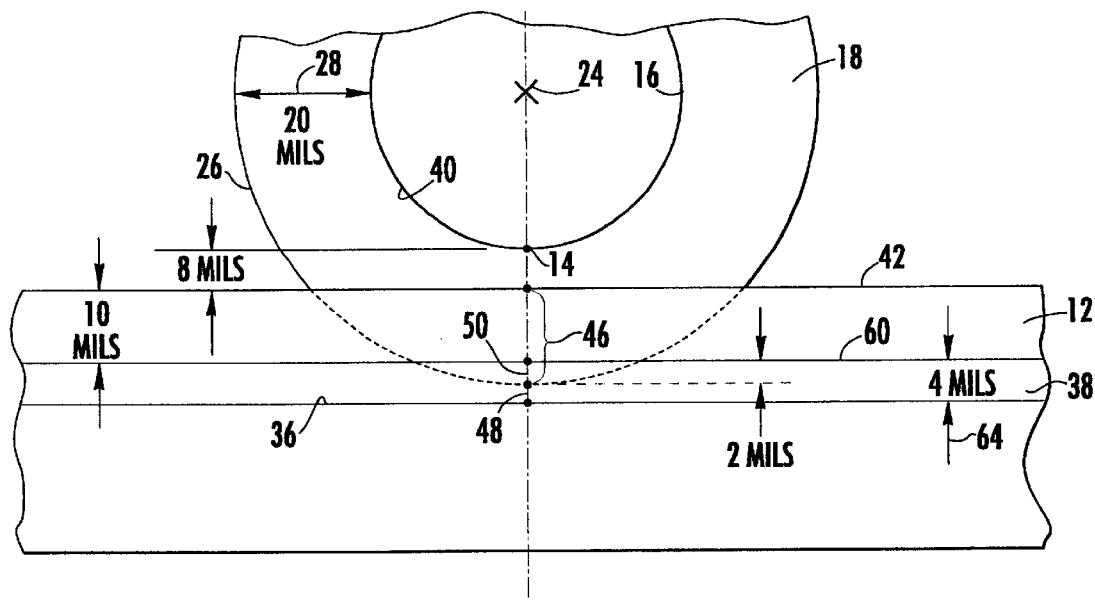
FIG. 4 is a partial diagrammatical elevation view of a wafer cutting arrangement.

By way of further example, and with reference to FIG. 4, it is preferred that the blade exposure 28 be about ten times the blade width 30. For example, a 0.002" thick blade would be exposed 0.020" as a rule of thumb. Application know-how by those skilled in the art will allow flexibility of adherence to this rule. In addition, there is a minimum or safe flange clearance 14 between a flange edge 40 and a substrate top surface 42. The flange clearance 14 must be sufficient for permitting coolant from a coolant nozzle 44, as illustrated with reference again to FIG. 1, to provide adequate cooling during the dicing process. Further, the flange clearance 14 must be monitored and a minimum clearance not exceeded in order to avoid contact between the flange edge 40 and the substrate top surface 42 which will result in damage to a typically expensive semiconductor wafer or substrate 12. With reference again to FIG. 4, and continuing with a dimensional example, cutting the substrate 12 having a thickness of 0.010" and wanting to cut through the substrate and beyond by 0.002", the depth of cut 46 would be 0.012". This would result in a flange clearance 14 of 0.008". As the dicing blade 18 wears, reducing the length of its outer diameter 20, and the dicing saw is programmed to automatically maintain the depth of cut 46, or a dicing saw operator manually lowers the blade 18, the flange clearance 14 is reduced. If such lowering continues, the flange 16 will collide with the substrate 12 resulting in damage to the substrate 12, the blade 18, and possibly cause injury to the operator. As a result, tracking the flange clearance 14 is an essential step for providing operator and product safety.

If one considers the flange clearance 14 at a dimension as small as 0.008", by way of example, and the that the operator cannot distinguish between clearances 14 of 0.008" and 0.000", it is apparent that the need exists to track such minute clearances automatically. Typically, a 5 mil flange clearance 14 is desired. An operator would have to see 3 mils of wear. When one adds coolant and blade shields (not shown) to protect the operator, the extreme difficulty in seeing the flange clearance 14 is further realized. Manually tracking blade wear and calculating any resulting reduction in flange clearance 14 becomes an impractical and inadequate method resulting in an untrustworthy operation for the dicing of expensive semiconductor substrates 12.

With reference again to FIG. 4, it is clear that in addition to monitoring the flange clearance 14 and depth of cut 46, a separation distance 48 between the blade cutting edge 26 and work surface 36 can also be determined. Further, a depth of cut 50 into the carrier 38 can also be monitored.

Figure 5:
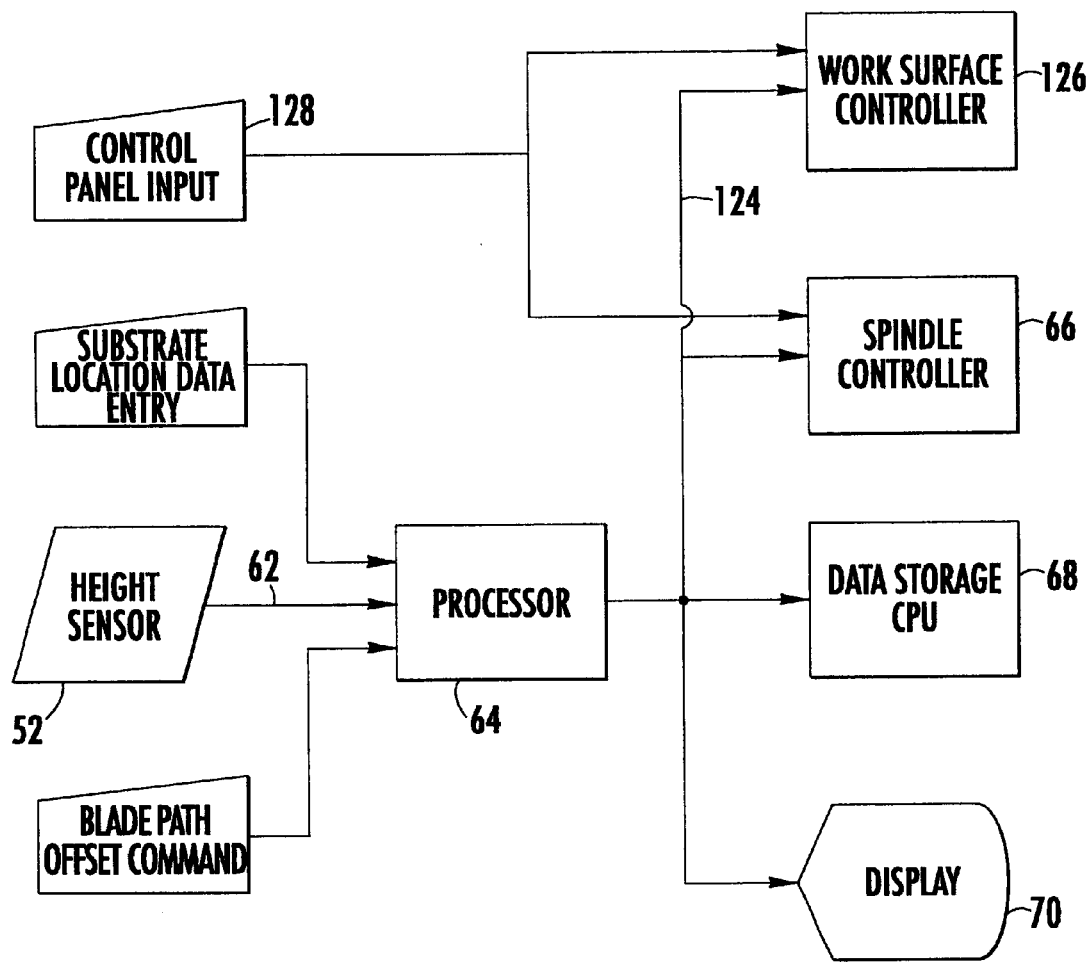
FIG. 5 is a functional block diagram of the system control used in one preferred embodiment of the present invention.

With reference again to FIG. 1, in one preferred embodiment of the present invention, a height sensor 52 is rigidly affixed to the dicing saw 54 with the work surface 36 and are moveable together. In this way, a sensing surface 56 of the height sensor 52 provides an accurate reference position 58. With such a reference position 58 for the sensing surface 56, the height positions of the work surface 36, the blade cutting edge 26, the substrate top surface 42, a carrier top surface 60 are measurable and their relative elevations located. The position of the spindle axis 24 is controllable for movement of the axis 24 for causing the cutting edge 26 of the blade 18 to make contact with the sensing surface 56 wherein the height sensor 52 provides a signal representative of the position of the blade cutting edge 26, relative to an initial position established prior to the cutting process. In one embodiment of the saw 54, the work surface 36 and sensor 52 move to position the sensor 52 and substrate 12 for the operation of the saw 54. As schematically illustrated with reference to FIG. 5, a sensing signal 62 is delivered to a processor 64 for calculating blade wear, the blade exposure 28, and thus the flange clearance 14 having data representative of the substrate thickness 34, carrier thickness 64 and surface locations as earlier described. The processor 64 calculates the flange clearance 14 by measuring the blade wear after a preselected number of cuts into the substrate 12 for automatically monitoring the exposure 28 and thus the flange clearance 14 during the dicing of the substrate 12. In typical operation, the dicing blade 18 makes multiple cuts through the substrate 12 for separating the substrate into individual chips or die (not shown), makes cuts into a blank substrate, or shapes a substrate as desired. By repeating the sensing of the blade cutting edge 26 through the movement of the spindle axis 24 toward the sensing surface 56 for contacting the sensing surface 56 with the blade cutting edge 26, the flange clearance 14, which is reduced as the blade 18 wears, is monitored during dicing or cutting of the substrate 12. The flange clearance 14 is calculated by the processor 64 using updated blade exposure 28, position of blade edge 26 above the work surface 36, the substrate thickness 34 and a diameter for the flange 16 selected. The processor 64 is programmable for controlling spindle movement 66 and for storing 68 and displaying 70 the input and monitored data.

With the data storage 68, a blade history is automatically tracked; with such history, displays blade wear information to the operator as well as total wear of the blade 18 using display 70. Such history is then used for determining the control of the spindle axis 24 for making height sensing movements. Efficiency is thus increased by making such height sensing movements when necessary based on the blade history for the blade 18 having a known composition. Empirical data rather than judgment is then relied upon for setting the control parameters for the dicing saw.

Figure 6:
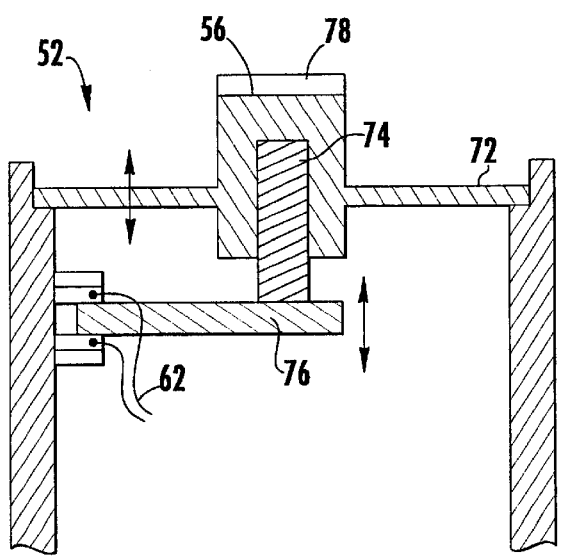
FIG. 6 is a partial cross-sectional view of a height sensor.

As illustrated by way of example with reference to FIG. 6, the height sensor 52 used in the embodiment herein described, comprises a sensor provided by European Semiconductor Equipment Center (ESEC), employing a flexible membrane 72 moveable when the sensing surface 56 is contacted. A ceramic member 74 is attached between the flexible membrane 72 and a piezo-electric crystal 76. Movement of the crystal 76 causes the signal 62, representative of the movement. The blade 18 makes contact with the sensing surface 56 while rotating and thus causes wear or cutting of the sensing surface 56. Such cutting or wear causes excessive vibration and damage to the piezo-electric crystal 76. Replacement of the height sensor 52 or components such as the flexible membrane 72 are impractical and often times expensive. An improvement to the height sensor is made by attaching a disk 78 to the sensing surface 56. The disk 78 is replaceable and protects the sensing surface 56. The disk 78 is preferably made of a hard material that will resist cutting by the dicing blade 18, or if damaged, easily and inexpensively replaced. In a preferred embodiment of the present invention, the disk 78 is magnetically attached to the sensing surface 56. Alternate adhesion methods, such as gluing, are acceptable. In one embodiment, the disk 78 is made from carbon steel. The carbon steel disk 78 is first nickel-coated for preventing the steel from rusting due to exposure from the coolant, and provided with a second coating of diamonds and chrome for providing hardness and resisting damage by the rotating blade 18. In an alternate embodiment, the disk 78 comprises a magnetic ceramic material.

In operation, and as illustrated with reference again to FIGS. 1 and 2, the blade 18 is mounted on the spindle 22 between the flange pair 17 for providing the blade exposure 28. The substrate 12 to be cut is mounted on the work surface 36 as earlier described, and as illustrated in the flow diagram of FIG. 7 as numeral 80. The blade 18 is rotated about the spindle axis 24 as is typical for dicing saws, and the substrate 12 is cut or diced as desired. The substrate dicing 82 continues for a preselected number of cuts. When the number of cuts reaches the preselected number, or exceeds a maximum specified 84, the blade edge 26 is delivered to the sensing surface 56 for making a height measurement 86. Blade exposure is calculated for determining the flange clearance 14 and the separation distance 48, as earlier described, is also calculated 88. The calculated flange clearance is compared to a minimum allowable clearance 90, and the separation distance 48 is compared 92 to a preselected distance. If the flange clearance 14 or the separation distance 48 do not meet that required, dicing saw operation is stopped 94 until corrective action is taken. If the dicing saw is operating within the standards set for flange clearance and separation, substrate dicing continues 96.

Figure 8A:
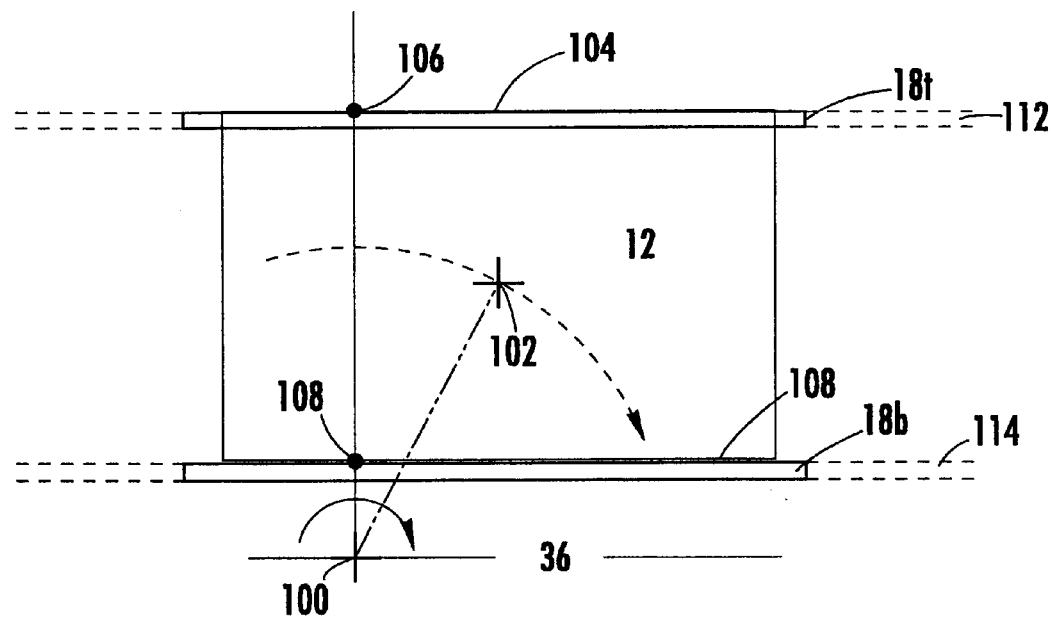
FIGS. 8a, 8b, and 8c are diagrammatical plan views of a substrate illustrating aligning and dicing thereof.

With reference now to FIG. 8a, it is typical for an operator of the dicing saw to attempt to mount the substrate 12 at the center 100 of the dicing saw chuck or work surface 36, as has been herein described, by way of example. However, there have always been errors in attempting a precise placement of the substrate 12. The present invention provides for the automatic transfer of a "home position" at the center 100 of the work surface 36 to the center 102 of the substrate 12, and uses the dicing saw processor 64 to compensate for placement of the substrate at other than work surface center 100. The present invention provides for the determination of the center 102 of the substrate 12 and its distance away from the center 100 of the work surface 36 by aligning of the dicing blade 18 at edges of the substrate 12 and entry of the edge locations into the processor 64.

As illustrated with reference again to FIG. 8a, determining the center 100 of the substrate 12 preferably comprises the step of first aligning the dicing blade 18t with a top edge 104 of the substrate 12 for determining a substrate top edge coordinate location 106 on the work surface 36 relative to the center 100 of the work surface. The location is entered into the processor 64. By way of example, reference is made to top and bottom edges as the edges would typically appear to the operator as the operator faces the work surface from in front of the dicing saw 54. Likewise, relative terms as first, second, and the like can also be used. Next, the dicing blade 18b is aligned with the bottom edge 108 of the substrate 12 for determining a substrate bottom edge location 110 on the work surface 36. The top edge 104 laterally opposes the bottom edge 110 and the rotational axis 24 of the dicing blade 18 is perpendicular to the blade paths 112, 114 respectively, along the top and bottom edges. Also, it is preferred that the same edge of the blade 18 be used when aligning the blade with the edges, the top edge of the blade 18 is illustrated herein by way of example. Further, the substrate 12 herein described by way of example has a rectangular shape. The present process is applicable to arcuate shaped substrates as well, in which case the blade 18 would be aligned generally tangent to the arcuate edge. Likewise, and as illustrated with reference to FIG. 8c, the substrate 12 may be placed on the work surface 36 at other than parallel to the blade path 112. In such a case, the blade would be preferably aligned with edges closest to the center of the substrate.

Figure 8B:
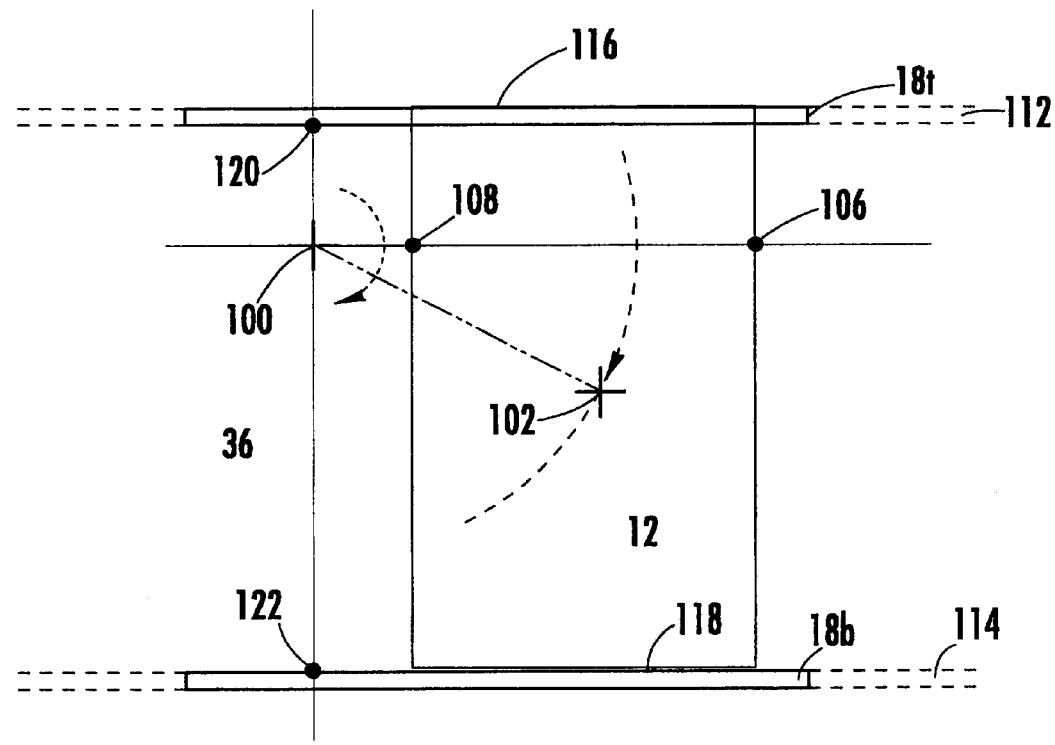
Figure 8C:
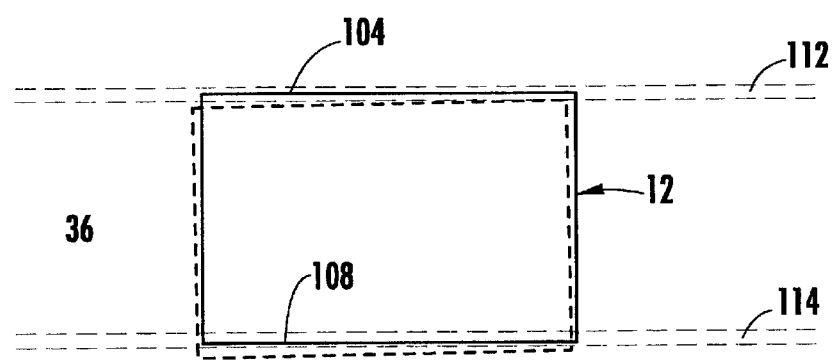

After alignment and data entry of the top and bottom edges 104, 108, the substrate is rotated by rotating the work surface ninety degrees, as illustrated with reference to FIG. 8b. The dicing blade 18t is aligned with a third edge, now viewed as a rotated top edge 116 of the rotated substrate 12 for determining a substrate rotated top edge location 120 on the work surface 36, wherein the blade path 112 along the rotated top edge 116 is perpendicular to the blade path along the earlier measured top edge 104. The dicing blade 18b is then aligned with the rotated bottom edge 118 for determining a substrate rotated bottom edge location 122 on the work surface, wherein the rotated top edge laterally opposes the rotated bottom edge. Rotated top and bottom edge locations 120, 122 are entered into the processor 64 for calculation of the center 102 of the substrate 12 and its location relative to the center 100 of the work surface 36. By determining a distance between the center of the substrate and the center of the work surface for providing a compensating command 124 to the processor 64, as illustrated with reference again to FIG. 5, for movement of the work surface by a controller 126. The controller 126 is manually directed during the aligning steps through a control panel input 128.

Figure 9:
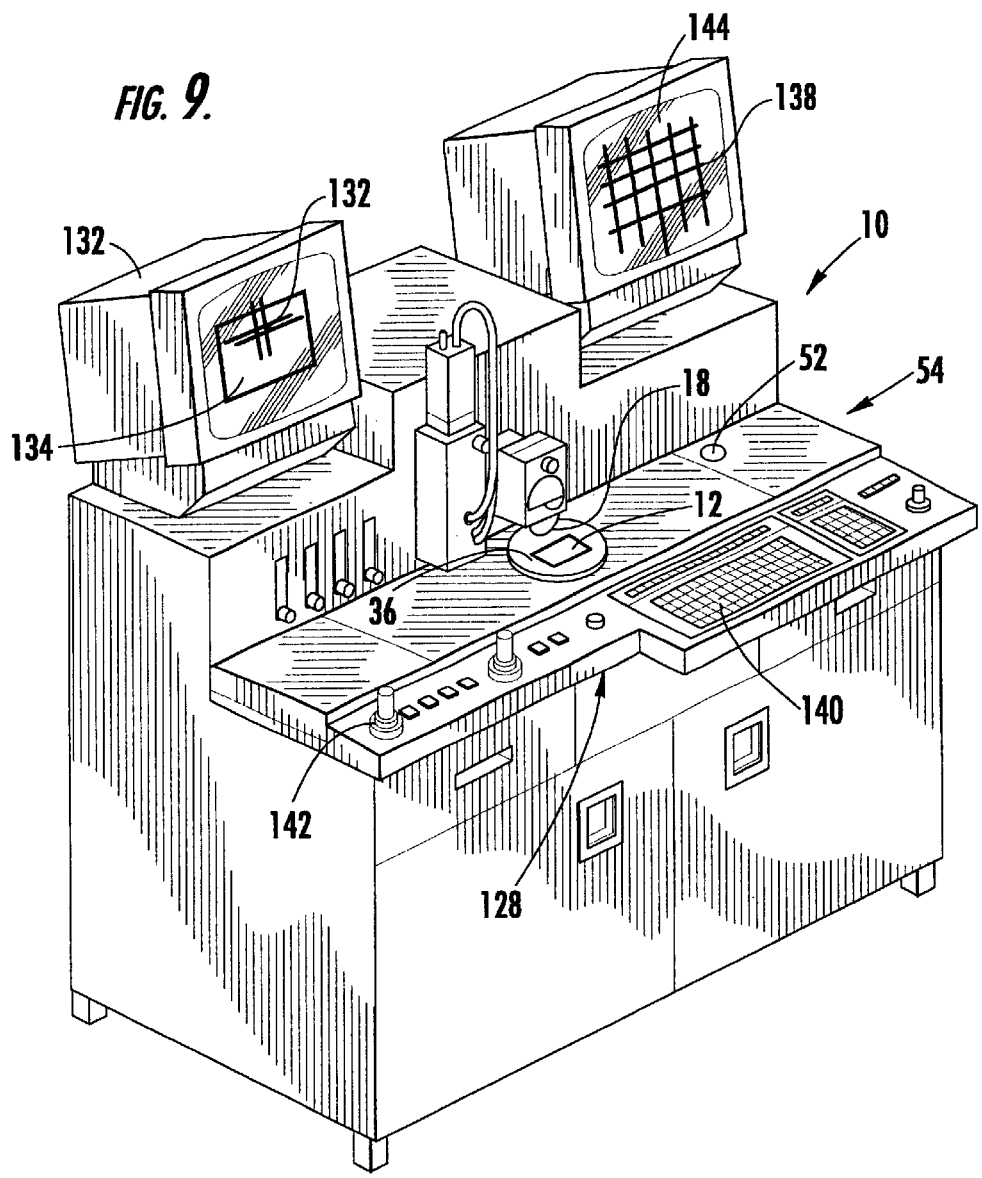
FIG. 9 is a perspective view of one preferred embodiment of a dicing saw operable with the present invention.

As illustrated with reference to FIG. 9, such alignment preferably includes the use of a camera 130 focused onto the substrate 12 and a video monitor 132 for viewing the substrate image 134 and blade path images which is indicated by cross hairs 136 provided for viewing by the video monitor 132. A data monitor 138, a keyboard 140, and joysticks 142 are provided for data input and processor output viewing. The process of lining up the top edge the blade 18 with the substrate 12 far edges preferably includes using the joystick and optics illustrated with reference to FIG. As described, the video monitor 132 displays the blade path as well as the substrate, and thus allows the operator to match up the entities by moving the joysticks 142 on the control panel 128. In a preferred operation, the work surface is at a rotation angle of zero degrees within an X-Y plane of the work surface. This zero degree rotation angle is approximate and should be fairly close for a rectangle substrate, but is not critical for a round or circular substrate. In one preferred embodiment of the system 10, a dialog box 144 on the data monitor 138 is viewed by the operator. Commands for the processor are viewed and the operator enters and views the particular commands such as the aligning steps earlier described. Further, and by way of example, in one programmed process, the work surface is automatically rotated after entry of the second alignment step. The workpiece is rotated 90 degrees and shown in its new orientation within the dialog box 144 on the data monitor 138.

Generally, the operator completes the alignment steps and with each step provides a data entry to the processor. For each step, the operator is guided by the processor through the dialog box display which will include a status as well as instructions for the process being completed. After sufficient data has been entered for a particular calculation, such as the determination of substrate center, the processor displays the substrate center coordinates, which coordinates are used to efficiently move the work surface during operation of the dicing saw for making multiple cuts into the substrate, as earlier described.

Figure 10:
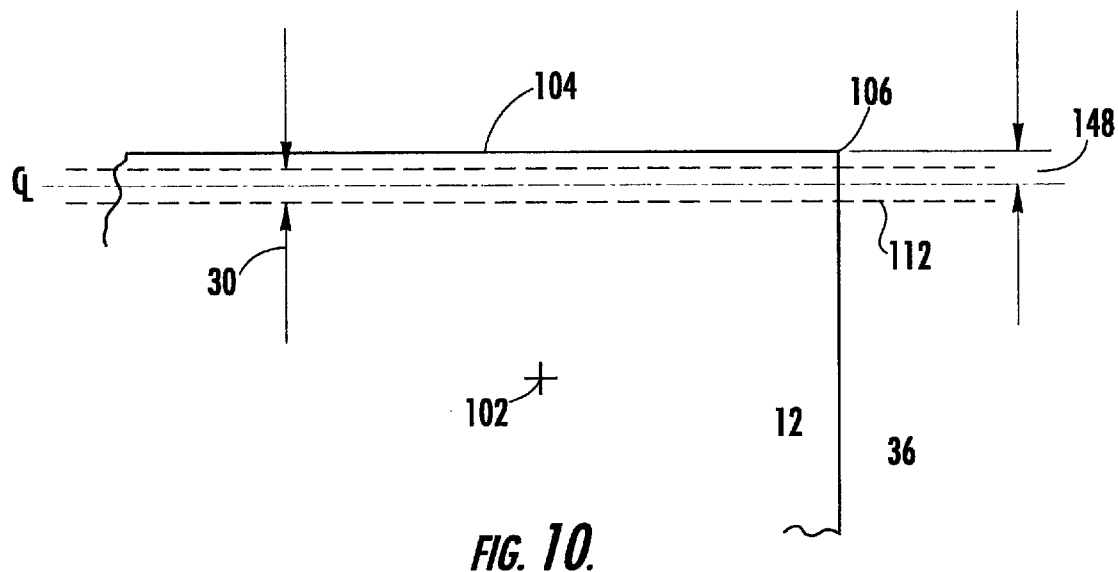
FIG. 10 is a partial diagrammatical plan view illustrating an offset blade path.

It is often desirable to make cuts in a blank substrate for reshaping the substrate or providing special cuts, whether rectangular or arcuate in shape. To avoid making a cut so close to the edge, top edge 104 by way of example with reference to FIG. 10, of the substrate 12 so as to damage the blade having blade width 30 or break apart the substrate, an offset command 146 is entered into the processor 64, as illustrated with reference again to FIG. 5, to allow the processor to automatically relocate the blade path 112 prior to cutting the blank substrate 12. The offset alignment process allows the operator to make a multiple offsets, and with the aid of the optics and joysticks earlier described, can adjust and select the applicable blade path 112 for the particular cut of interest.

Generally, the offset alignment will be made for all desirable sides of the substrate before the dicing begins. The automatic adjustment or offset alignment for the preselected edges are made just before the side is cut. An offset dimension will generally range from zero to a few millimeters. An offset will also be used when a blank substrate or wafer having a circuit pattern removed from its edges is to be cut. In other words there are no streets with discrete die formations on the substrate, by way of example.

As illustrated, by way of example, with reference again to FIG. 10, the operator lines up the top edge 104 of the substrate 12 for displacement 148 of the cut at a distance into the substrate toward the center 102 of the substrate. An offset dimension representative of the displacement 148 is entered into the processor, and will typically only be activated on the first cut line for a given side. To initiate the offset process, the operator will align the cross hairs 136, earlier described with reference to FIG. 9, using the optics joysticks 142 to set the edge location 106 of the substrate. The offset will be calculated from this aligned location 106. When desired, a flange alignment is also implemented with respect to the center of the substrate.

Figure 11:
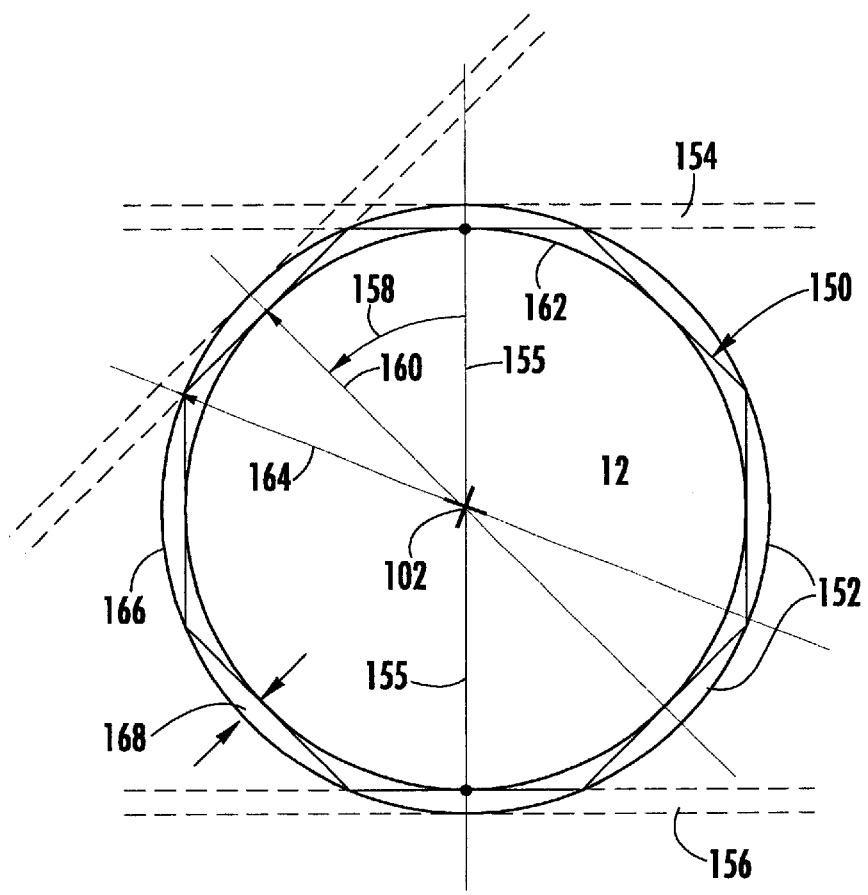
FIG. 11 is a diagrammatical plan view illustrating a circular cutting of a substrate in accordance with the present invention.

By way of further example of the unique capability provided to the dicing saw by the present inventive methods, the blank substrate 12 is cut into a circular shape substrate 150 or a circle may be cut therein, as illustrated with reference to FIG. 11. As earlier described with reference to FIGS. 8a and 8b, the present invention provides for accurately locating the center 102 of the substrate. As a result, an arcuate cut can be made into the substrate by making a multiplicity of straight dicing styled cuts 152. In a preferred method, the dicing blade aligning comprises first aligning the dicing blade for travel along a first blade path 154 at a preselected distance 155 from the center 102 of the substrate 12 for the dicing thereof. A desired cut is made into the substrate. Then the dicing blade is aligned for travel along a second blade path 156 at the preselected distance 155 from the center 102 of the substrate 12 for the dicing thereof, wherein the second blade path radially opposes the first blade path. A desired cut is then made. The substrate is rotated by a preselected arc 158 and the aligning and dicing steps are repeated for providing the multiple cuts 152 within the substrate. The substrate rotating comprises incrementally rotating of the substrate a multiplicity of times sufficient for providing an arcuate cut to the substrate. With such a method, the circular shaped substrate 150 can result. The accuracy or tolerance within which a circle can be cut will depend on the preselected number of multiple straight cuts 152, generally governed by the specific use of the substrate an the practicality of making a large number of cuts. One measurement of tolerance includes the difference in the length of a radius 160 for a circle 162 inscribed tangent to and excluding the multi-sided arcuate shape 150 and a radius 164 of a circle 166 inscribed tangent to and including the multi-sided shape. This tolerance is illustrated with numeral 168 in FIG. 11, by way of example.

Some important guidelines that should be considered in the selection of equipment intended for dicing hard, brittle materials include those related to feed rate or work surface movement, spindle rotational speed, blade use, and depth of cut. The range of feed rates available is important, and should be compatible with the intended applications. Beware of machines that cannot achieve the low range of feed rates, and those that produce uneven table movement when set to low feed rates. The spindle rotational speed (rpm) is preferably variable, and preferably from about 5,000 to 40,000 rpm for a nominal two through five inch diameter blade. The method of accomplishing spindle speed changes is important, and the machine should provide operator indication of the selected spindle speed. The dicing saw should be capable of accepting hub-type or free-standing diamond blades in conjunction with adjustable coolant nozzles 44 and microscope alignment to accommodate any design differences. A machine that limits the user to a single type or source of diamond blade 12 should not even be considered. When considering the selection of a dicing saw, the maximum attainable depth of cut 46 should be ascertained, so that optimum blade utilization can be realized. This is a particularly important consideration for cutting thick substrates or substrates 12 as described herein.

We would all like to think that any cutting task could be successfully achieved by simply acquiring any machine and blade 18 combination, producing parts with virtually no loss of the substrate 12 or material being processed, and experiencing no edge damage to the finished parts or diced substrate. However, it has been shown that careful planning and control over the numerous variables is necessary in order to create such an efficient sawing system. Material type, depth of cut, desired throughput, feed rates, spindle speed, cooling nozzle design, mounting, kerf, blade exposure, diamond particle size, available power, and blade flange design, are but a partial list of the variable components affecting the sawing process. There are three critical laws or constraints for dicing and diamond grinding technology that should be followed. Applying these laws properly is critical in the proper selection of process components.

The parameters of rigidity, power, and cooling must be considered for each system component selection. It must also be understood that each component involved in the dicing or cutting process cannot create sawing efficiency alone, but rather all of the components as an interactive system must be compatible in meeting standards. If just one component is in error, it could render all other properly selected components ineffective due to its dominance in the sawing process. Whether dicing thin silicon materials at inch-per-second feed rates, or cutting into heavy cross-sections of ceramic-based materially, system rigidity plays a major role in sawing efficiency. It is most important to note that rigidity not only pertains to the equipment being used, but also to the diamond blade 18 and workpiece or substrate 12 mounting methods, as well as to operating parameters. A rigidly mounted spindle 22 with virtually no end play or vibration is mandatory for dicing and diamond grinding. Additionally, the perpendicularity of the spindle axis 24 to the spindle direction of movement toward the work surface 36 is essential for the diamond blade 18 to run true. Presently, air-bearing spindles are the most commonly used because of their exceptionally smooth operation and extended working life.

While most end users will take considerable steps in assuring the rigidity of the machine they purchase, they will most often overlook the critical mounting requirements necessary for the diamond blade. No matter how well the diamond blade 18 was manufactured to run true, it can only run as accurately as the surfaces with which it comes into contact. The bearing surfaces of the flanges 16 or spacers (not shown) must be flat, clean, and parallel. Spacers used in gang cutting operations are generally made from aluminum or titanium carbide, depending on the application. As described, the flanges 16 for single blade mounting are usually made from stainless steel. The flanges 16 will incorporate an undercut to reduce the bearing surface area in order to enhance intimate contact with the diamond blade. These surfaces, as well as the diamond blade surfaces, must be clean, with no loose particles present prior to assembly. This insures proper fitting of the mating surfaces. All flanges and spacers must be supplied with torque specifications to aid the user in preventing distortion and separation of the bearing surfaces from the diamond blade. The most frequent cause of blade breakage and oversize cut widths, with relation to blade thickness 30, is an improper flange torque or poor flange quality. Flanges 16 and spacers must be of high integrity in order not to induce vibration at operating spindle speeds.

The blade exposure 28 is a critical component within the variables affecting the overall rigidity of the sawing system. Over-exposure may cause wider than desired kerf, excessive edge chipping, non-squareness of cut, and blade breakage, while too little blade exposure can divert the critical coolant supply from the blade/material interface. The best results will be attained by adjusting the "ten times blade thickness" guideline or rule, earlier described, in accordance with a prerequisite that at least ⅓ to ½ of the diamond blade's exposure be buried into the cut. This prerequisite is the dominant variable in establishing proper blade exposure 28. This approach offers improved stability at start, and depending upon material hardness and feed rates, can be fine-tuned with only minor adjustments. The tendency should be to expose the diamond blade 18 at a minimum to attain maximum blade rigidity, with caution given in regard to a possible coolant cut-off or a collision of the flange with the workpiece. The alternative is to run a maximum exposure within the guidelines, to reduce the amount of flange changes required in order to consume the entire working range of the self-sharpening diamond blade.

Equally important to rigid blade mounting procedures are the substrate mounting techniques. These two variables of the sawing system are the closest in proximity to the desired finished parts, and warrant proper attention. As earlier described, the substrate 12 is normally mounted on an intermediate carrier 38, which is then mounted onto the work surface by vacuum or mechanical means. This enables the user to cut completely through the substrate without causing damage to the work surface 36. Vacuum work surface chuck systems require a vacuum gauge to indicate holding stability and assure operating safety. The two most common intermediate carriers 38 are tape and glass. The substrate 12 is held to the "tacky" side of the tape, while wax is used as the holding medium for mounting on glass.

Effective cooling of the diamond blade at the point of contact with the material being processed is a basic essential for any diamond grinding application. The starting point for an efficient cooling system is the supply nozzle configuration 44 which directs the coolant medium. Dual nozzle 44 arrangements, illustrated with reference again to FIG. 2, are superior to single nozzle design in supplying coolant to the critical areas of the diamond blade during the cutting operation. Coolant must be directed at the blade/material interface as well as the leading edge of the blade. The coolant, after leaving this initial contact point, should follow along both sides and the extreme outside edge of the blade in such a manner that it will create intimate contact with these blade surfaces. A single nozzle will satisfy the directional requirement, but will fail to create intimate contact with the blade along its sides. The single stream of coolant, directed at the cutting interface, is split by the diamond blade into two separate streams and deflected away from the sides of the blade. The resulting decrease in cooling efficiency is noted by higher edge chipping damage when processing brittle materials, lower blade life, and erosion on the sides of the diamond blade, which will cause uneven cuts. Dual Nozzles provide two separate streams of coolant to the cutting interface, and at an angle to the cutting edge of the blade, so that each stream will favor one side of the diamond blade after providing the necessary coolant to the leading edge. This complement provides the necessary coolant to all of the critical areas of the cutting blade, with no loss of direction required for removing the debris generated during cutting. Coolant nozzles 44 must provide a full and airless flow of coolant. Additionally, the nozzles should be installed in close proximity to the blade in order to prevent excessive pressure drop of the supply, and to insure that no air will become entrapped in the coolant stream prior to contact with the blade/material interface. Recirculating coolant systems require efficient filtering to remove the particles generated during cutting. Coolant temperatures have a pronounced effect on blade life and cut quality in diamond grinding technology. Test results indicate that coolant temperatures above 80 degrees Fahrenheit should be avoided, while temperatures of 50 degrees or less dramatically improve cutting performance. Refrigeration of the coolant medium is easily adapted to most recirculating systems, and is highly recommended.

While a specific embodiments of the invention have been described in detail herein above, it is to be understood that various modifications may be made from the specific details described herein without departing from the spirit and scope of the invention as set forth in the appended claims. Having now described the invention, the construction, the operation and use of preferred embodiments thereof, and the advantageous new and useful results obtained thereby, the new and useful constructions, methods of use and reasonable mechanical equivalents thereof obvious to those skilled in the art, are set forth in the appended claims.

What is claimed is:

1. A method for dicing a substrate using a programmable dicing saw having a processor operable for movement of a spindle carrying a dicing blade for movement relative to a work surface carrying a substrate, wherein movement of a dicing blade across the work surface is controlled by movements within an orthogonal coordinate system having its center at a center location of the work surface, the method comprising the steps of:

aligning the dicing blade with a first edge of the substrate for determining a substrate first edge location;

aligning the dicing blade with a second edge of the substrate for determining a substrate second edge location, wherein the first edge laterally opposes the second edge and the rotational axis of the dicing blade is perpendicular to first and second blade paths along the first and second edges;

rotating the substrate ninety degrees about an axis perpendicular thereto;

aligning the dicing blade with a third edge of the rotated substrate for determining a substrate third edge location, wherein a third blade path along the third edge is perpendicular to the first blade path along the first edge;

aligning the dicing blade with a fourth edge of the substrate for determining a substrate fourth edge location, wherein the third edge laterally opposes the fourth edge;

entering edge location data representative of the substrate first, second, third, and fourth edge locations into the processor for determining a center of the substrate;

determining a distance between the center of the substrate and the center of the work surface for providing a compensating command to the programmable dicing saw;

positioning the dicing blade over the center of the substrate;

moving the spindle relative to the center of the substrate for positioning the dicing blade based on the compensating command;

aligning the dicing blade for making a cut into the substrate along the first blade path;

dicing the substrate along the first blade path;

aligning the dicing blade for making a cut into the substrate along the second blade path;

dicing the substrate along the second blade path.

2. A substrate dicing method according to claim 1, wherein the first blade path aligning step comprises the steps of:

aligning the dicing blade for travel parallel to and proximate the first edge of the substrate; and providing an offset command to the programmable dicing saw for laterally moving the blade toward the center of the substrate prior to making a cut into the substrate.

3. A substrate dicing method according to claim 1, wherein the substrate dicing steps comprise making a series of cuts into the substrate while advancing the blade into the substrate.

4. A substrate dicing method according to claim 1, further comprising the steps of:

sensing the blade cutting edge during blade rotation prior to the substrate dicing steps for setting a reference position for the blade edge; and sensing the blade cutting edge after a preselected number of cuts for determining an amount of blade wear.

5. A method for dicing a substrate using a programmable dicing saw having a processor operable for movement of a spindle carrying a dicing blade relative to a work surface carrying a substrate, wherein movement of the dicing blade relative to the work surface is controlled by movements within an orthogonal coordinate system having its center at a center location of the work surface, the method comprising the steps of:

aligning the dicing blade with a first edge of the substrate for determining a substrate first edge location;

aligning the dicing blade with a second edge of the substrate for determining a substrate second edge location, wherein the first edge laterally opposes the second edge;

rotating the substrate ninety degrees about an axis perpendicular thereto;

aligning the dicing blade with a third edge of the rotated substrate for determining a substrate third edge location, wherein the blade path along the third edge is perpendicular to the blade path along the first edge;

aligning the dicing blade with a fourth edge of the substrate for determining a substrate fourth edge location, wherein the third edge laterally opposes the fourth edge;

providing edge location data representative of the substrate first, second, third, and fourth edge locations to the processor for determining a center of the substrate; determining a distance between the center of the substrate and the center of the work surface for providing a compensating command to the programmable dicing saw;

moving the spindle relative to the center of the substrate for aligning the dicing blade based on the compensating command;

aligning the dicing blade; and dicing the substrate.

6. A substrate dicing method according to claim 5, wherein the dicing blade aligning step comprises the steps of:

aligning the dicing blade for travel along a first blade path parallel to and proximate the first edge of the substrate;

preselecting an offset distance for lateral movement of the dicing blade toward the center of the substrate for making a cut into the substrate;

providing an offset command representative of the offset distance to the programmable dicing saw for laterally moving the blade toward the center of the substrate prior to making the cut into the substrate.

7. A substrate dicing method according to claim 5, wherein the dicing blade aligning step comprises the steps of:

first aligning the dicing blade for travel along a first blade path at a preselected distance from the center of the substrate for the dicing thereof;

first dicing the substrate along the first blade path;

rotating the substrate about the center thereof by a preselected angle for aligning the dicing blade for travel along a second blade path at the preselected distance from the center of the substrate for the dicing thereof;

second dicing the substrate along the second blade path; and repeating the aligning and dicing steps for forming an arcuate cut into the substrate, the arcuate cut comprising a multiplicity of straight line cuts.

8. A substrate dicing method according to claim 7, wherein the second aligning and dicing steps cut into the substrate along a blade path parallel to and radially opposing a cut resulting from the first aligning and dicing steps.

9. A substrate dicing method according to claim 8, wherein the multiplicity of rotating steps in combination with the dicing steps are sufficient for forming a circular shaped substrate.

10. A substrate dicing method according to claim 7, further comprising the steps of:

preselecting an offset distance for lateral movement of the dicing blade toward the center of the substrate for making a cut into the substrate; and providing an offset command to the programmable dicing saw for laterally moving the blade toward the center of the substrate prior to making a cut into the substrate.

11. A substrate dicing method according to claim 5, further comprising the steps of:

calculating a separation distance between the work surface and a cutting edge of the dicing blade; and stopping blade movement into the substrate when the blade cutting edge is greater than a preselected separation distance.

12. A method for dicing a substrate using a programmable dicing saw having a processor operable for movement of a spindle carrying a dicing saw relative to a work surface carrying a substrate, the method comprising the steps of:

determining a distance between a center of the substrate and a center of the work surface for providing a compensating command;

determining a center of the substrate;

moving the spindle relative to the center of the substrate for aligning the dicing blade based on the compensating command; and dicing the substrate.

13. A substrate dicing method according to claim 12, wherein the substrate center determining step comprises the steps of:

aligning the dicing blade with a first edge of the substrate for determining a substrate first edge location;

aligning the dicing blade with a second edge of the substrate for determining a substrate second edge location, wherein the first edge laterally opposes the second edge and the rotational axis of the dicing blade is perpendicular to the blade paths through the first and second edges;

rotating the substrate ninety degrees about an axis perpendicular thereto;

aligning the dicing blade with a third edge of the rotated substrate for determining a substrate third edge location, wherein the blade path along the third edge is perpendicular to the blade path along the first edge;

aligning the dicing blade with a fourth edge of the substrate for determining a substrate fourth edge location, wherein the third edge laterally opposes the fourth edge; and providing edge location data representative of the substrate first, second, third, and fourth edge locations to the processor for determining the center of the substrate.

14. A substrate dicing method according to claim 12, further comprising the steps of:

aligning the dicing blade for travel along a first blade path parallel to and proximate the first edge of the substrate;

preselecting an offset distance for lateral movement of the dicing blade toward the center of the substrate for making a cut into the substrate;

providing an offset command representative of the offset distance to the programmable dicing saw for laterally moving the blade toward the center of the substrate prior to making the cut into the substrate.

15. A substrate dicing method according to claim 12, wherein the dicing blade aligning step comprises the steps of:

aligning the dicing blade for travel along a first blade path at a preselected distance from the center of the substrate for the dicing thereof;

dicing the substrate along the first blade path;

rotating the substrate about the center thereof by a preselected angle for aligning the dicing blade for travel along a second blade path at the preselected distance from the center of the substrate for the dicing thereof;

dicing the substrate along the second blade path; and repeating the aligning and dicing steps for forming an arcuate cut into the substrate, the arcuate cut comprising a multiplicity of straight line cuts.

16. A substrate dicing method according to claim 15, wherein the second aligning and dicing steps cut into the substrate along a blade path parallel to and radially opposing a cut resulting from the first aligning and dicing steps.

17. A substrate dicing method according to claim 16, wherein the multiplicity of rotating steps in combination with the dicing steps are sufficient for forming a circular shaped substrate.

18. A substrate dicing method according to claim 12, further comprising the steps of:

aligning the dicing blade proximate an edge of the substrate for dicing along a blade path generally along the edge;

preselecting an offset distance for lateral movement of the dicing blade toward the center of the substrate for making a cut into the substrate;

providing an offset command to the programmable dicing saw for laterally moving the blade away from the edge and toward the center of the substrate prior to the dicing step.

19. A method for dicing a substrate using a programmable dicing saw having a processor operable for movement of a spindle carrying a dicing blade relative to a work surface carrying a substrate, the method comprising the steps of:

aligning the dicing blade for travel along a blade path parallel to and proximate an edge of the substrate;

preselecting an offset distance for lateral movement of the dicing blade toward a center of the substrate for making a cut therein;

entering data into the processor representative of the offset distance;

automatically realigning the dicing blade by transversely moving the dicing blade toward the center of the substrate by the offset distance for travel along an adjusted blade path; and dicing the substrate along the adjusted blade path.

20. A substrate dicing method according to claim 19, further comprising the steps of:

aligning the dicing blade with a second edge of the substrate for determining a substrate second edge location, wherein the first edge laterally opposes the second edge and the rotational axis of the dicing blade is perpendicular to the blade paths through the first and second edges;

rotating the substrate ninety degrees about an axis perpendicular thereto;

aligning the dicing blade with a third edge of the rotated substrate for determining a substrate third edge location, wherein the blade path along the third edge is perpendicular to the blade path along the first edge;

aligning the dicing blade with a fourth edge of the substrate for determining a substrate fourth edge location, wherein the third edge laterally opposes the fourth edge; and providing edge location data representative of the substrate first, second, third, and fourth edge locations to the processor for determining a center of the substrate.

21. A substrate dicing method according to claim 20, wherein the dicing blade aligning step comprises the steps of:

aligning the dicing blade for travel along a first blade path at a preselected distance from the center of the substrate for the dicing thereof;

aligning the dicing blade for travel along a second blade path at the preselected distance from the center of the substrate for the dicing thereof, wherein the second blade path radially opposes the first blade path;

rotating the substrate about the center thereof; and repeating the aligning steps for travel along the first and second blade paths.

22. A substrate dicing method according to claim 21, wherein the substrate rotating step comprises steps of incrementally rotating the substrate a multiplicity of times sufficient for providing an arcuate cut to the substrate.

* * * * *